March 31, 1964
J. A. ROBERTS
3,127,032
STORAGE APPARATUS
Filed July 12, 1962
2 Sheets-Sheet 1
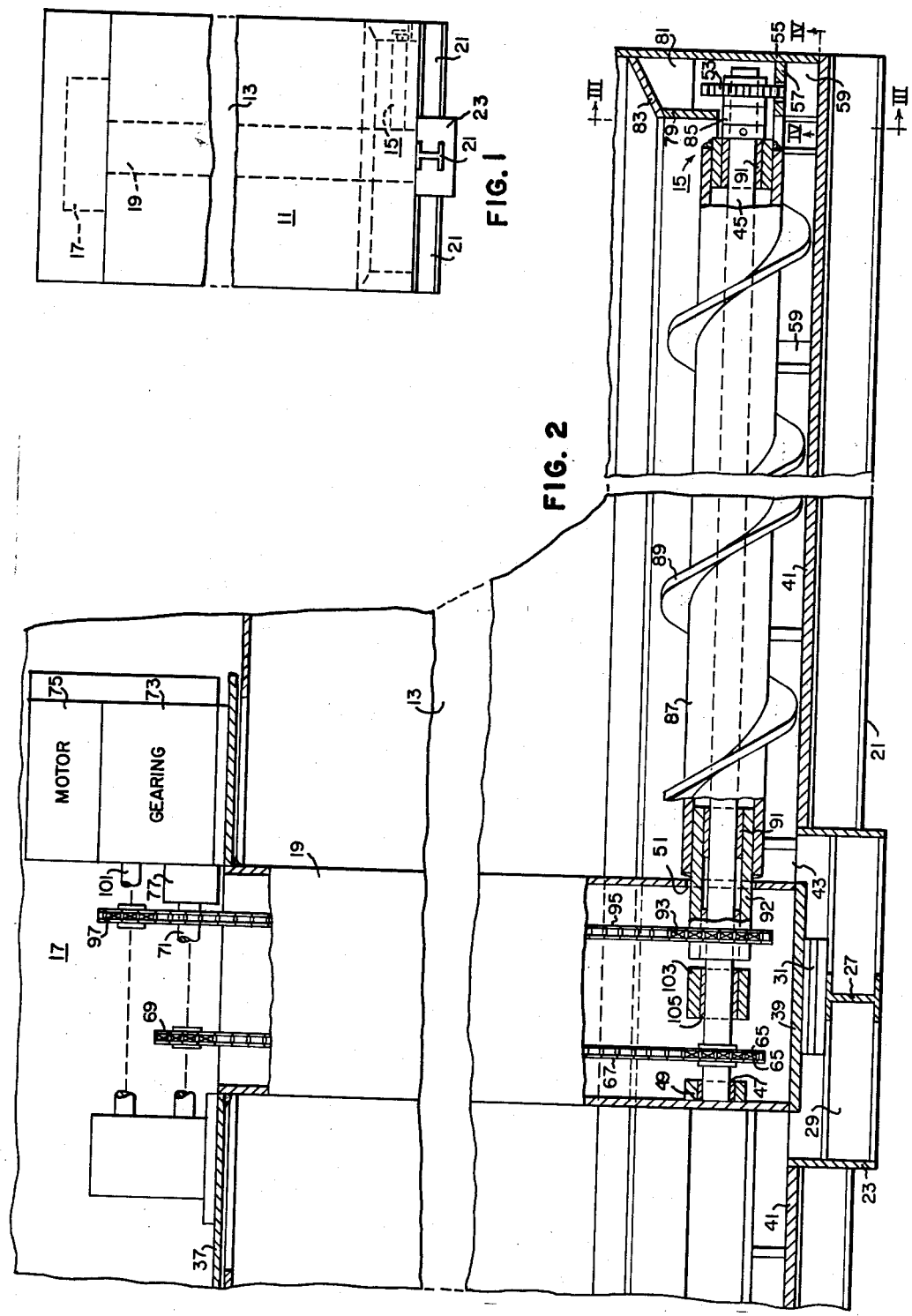

March 31, 1964    J. A. ROBERTS    3,127,032
STORAGE APPARATUS
Filed July 12, 1962
2 Sheets-Sheet 2
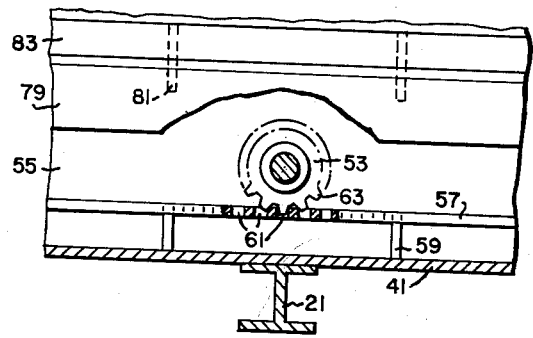
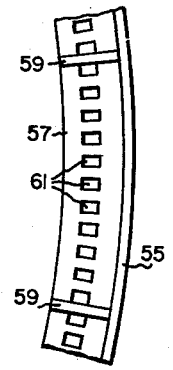
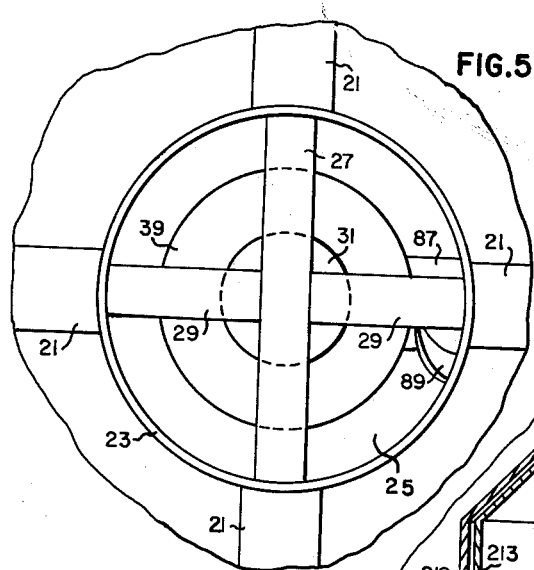
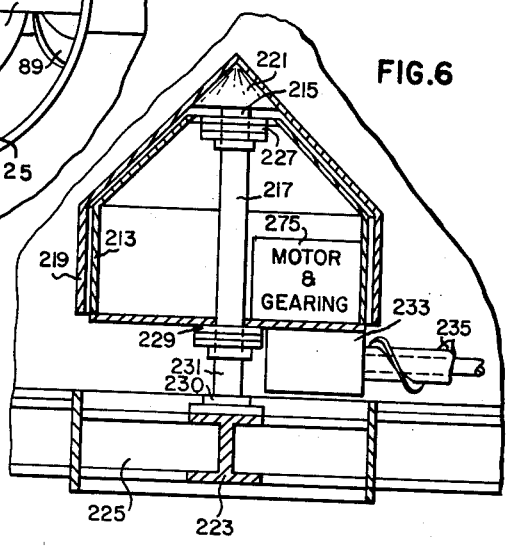

United States Patent Office 3,127,032
Patented Mar. 31, 1964

3,127,032
STORAGE APPARATUS
John A. Roberts, 2554 Lindenwood Drive,
Bridgeville, Pa.
Filed July 12, 1962, Ser. No. 209,417
6 Claims. (Cl. 214—17)

This invention relates to improved apparatus for the storing and handling of particulate or granular materials and relates particularly to a new storage facility.

In the handling of bulk particulate or aggregate materials such as chemical fertilizers, grain, semi-processed minerals, etc., it is common practice to provide silo-type storage tanks. Belt conveyors and other type machines easily and efficiently fill such storage tanks by transporting such materials through an opening at the top. However, the unloading of such a storage tank is not such a simple matter. Storage tanks are difficult to empty from an opening in the bottom of the tank, particularly when the tank contains a substantial quantity of the particulate or granular material being stored because the material at the bottom of the tank is highly compacted and prevents the material from flowing freely. Attempts to overcome this difficulty by constructing the bottom of such a storage tank in funnel fashion has been relatively unsuccessful, particularly when used for the storage of material susceptible to compacting under pressure. Also, such a facility constitutes a waste in space since the funnel portion of such a tank cannot hold the equivalent of a full sized silo-type storage tank. Consequently, such structures are expensive and uneconomical in the storage space they provide.

Attempts to mechanically remove such materials from the bottom of such a storage tank have also been relatively unsuccessful since it is necessary to remove such material uniformly from the entire bottom area to avoid compacting of the particulate or granular material in a manner to prevent further removal. Worm-type conveyors projecting into the bottom of such a storage tank are unsatisfactory since the compacting material forms a tunnel around the conveyor. Even if the conveyor is constructed to move back and forth in a windshield wiper fashion it will not effectively remove materials from such storage tanks. Prior to the present invention, the only really successful method of removing such materials from silo-type storage tanks was to empty them by means of portable conveyors from the top of the stored material. Such methods are awkard and expensive since they require manual handling and must be transported in and out of the storage facility.

The storage facility of the present invention provides a storage tank for particulate or granular material of the silo type that may be emptied from the bottom easily and efficiently regardless of the compacting nature of the materials being stored and which makes efficient use of storage space.

Accordingly, it is the object of the present invention to provide a silo-type storage facility for storing particulate or granular material that may be unloaded from the bottom.

It is also the object of the present invention to provide a means for unloading a silo-type storage facility from the bottom that will completely remove all of the material and will not be affected by the compacting of the material.

It is a still further object of the present invention to provide a silo-type storage facility that will efficiently store particulate or granular material that is particularly susceptible to compacting but which will provide means for unloading such material from the bottom of the facility.

Other objects and advantageous features will be obvious from the following specification and drawings wherein:

FIG. 1 is an elevation view, partially in section, of a storage tank which constitutes one embodiment of the apparatus of the present invention;

FIG. 2 is a detailed view, partially in cross section and partially in elevation, of broken away portions of the storage tank of FIG. 1 showing details of the unloading apparatus and its propelling mechanism;

FIG. 3 is a sectional view taken along the line III—III of FIG. 2;

FIG. 4 is a view of a section of the track 57 of FIGS. 1, 2 and 3 as viewed from the bottom (see IV—IV of FIG. 2);

FIG. 5 is a view in elevation of the storage tank of FIGS. 1 and 2 looking at the bottom of the tank; and FIG. 6 is a schematic drawing of another embodiment of the present invention.

In the drawings there is shown a silo-type storage tank 11 (FIG. 1) which constitutes one embodiment of the apparatus of the present invention. Storage tank 11 is shown to be broken away at 13 to indicate that the tank will normally be much taller in scale than shown by FIG. 1. The tank 11 is shown (by dotted lines in FIG. 1) to contain an unloading apparatus shown generally at 15, a driving mechanism located at 17, and a tubular connecting shaft 19.

FIG. 2 shows a blown up and broken away view of a portion of the tank 11 of FIG. 1 having a greater broken away section 13. The view of FIG. 2 shows the details of construction and operation of the unloading apparatus 15 and an optional, but workable driving mechanism 17.

The tank 11 is constructed of sheet steel (or other suitable construction material) of appropriate gauge to provide adequate strength for storage and is shown to be supported by or rest upon supporting I-beams 21. The I-beams 21 are shown to converge on a sleeve-shaped member 23 to which they are attached as by welding or other suitable means. Sleeve-shaped member 23 provides an opening 25 (FIG. 5) in the bottom of the tank 11. A cross beam 27 spans the opening 25 and effects continuous supporting means between two of the opposing supporting members 21. Cross beams 29 perform the same function for the remaining two I-beams 21, but abut the beam 27 and hence must be composed of two members.

The shaft 19 is shown by FIGS. 2 and 5 to be supported by the beams 27 and 29 and, as shown particularly by FIG. 2, is mounted on a thrust bearing illustrated at 31. The drive mechanism at the top of the tank 11 is supported by circular plate 37 which is attached, as by welding, to the tubular shaft 19. Plate 37 also may be supported by bearing surfaces (not shown) if such support is deemed necessary by the size of the structure. In any event, the shaft 19 is free to rotate within the tank 11.

In the present embodiments the beams 27 and 29 are shown to be below the level of I-beams 21 so that the bottom plate 39 of the tubular shaft 19 is on a level with the bottom plate 41 of the storage tank 11. Such arrangement provides for a specific opening 43 at the bottom of the tank 11 between the shaft 19 and sleeve-shaped member 23 within the opening 25, inhibited only by the beams 27 and 29.

A drive shaft 45 is rotatably mounted within the tubular connecting shaft 19 to a bearing surface 47 mounted within a collar 49 that is attached by suitable means to the inside surface of the tubular shaft 19. The shaft 45 projects through an opening 51 in the opposing wall of the tubular shaft 19 and terminates in a drive sprocket 53 that is rigidly attached or keyed to the end of the drive shaft 45 near the outer wall 55 of the tank 11.

Positioned continuously around the inside circumference of the tank 11, and, in the present embodiment attached to the wall 55, is a perforated track 57. Perforated track 57 is supported from the bottom plate 41 and wall 55 of the tank 11 by supporting members 59. As may be particularly observed by FIGS. 3 and 4, the perforations 61 are regularly spaced and are disposed to mesh with the teeth 63 of the sprocket 53. Consequently, it may be observed that rotation of the shaft 45 effects rotation of the sprocket 53 which moves along the rail 57 causing the tubular shaft 19 to rotate on bearings 31. The shaft 45 swings axially about the bottom of the tank 11 and sweeps the entire area between the axially located tubular shaft 19 and the wall 55 of the storage tank 11.

A drive sprocket 65 is attached to drive shaft 45 within the tubular shaft 19. The sprocket 65, and hence the drive shaft 45, is driven by means of a drive chain 67 projecting through the tubular shaft 19 to a sprocket 69 mounted at the top of the shaft to a drive shaft 71 that is driven by an appropriate motor and gearing arrangement illustrated generally at 73 and 75. Interposed between the driving gears 73 and the shaft 71 there is shown a torque clutch, as at 77. Details of the torque clutch 77 are not shown, as such clutches are well known and the exact type employed is optional in the present embodiment. Examples of suitable torque clutches may be found in United States Patents 2,582,077, 2,593,521, 2,969,132 and 2,969,133.

The sprocket 53 attached to the end of drive shaft 45 and disposed to ride on perforated rail 57 is partially incased in a protective ring-shaped member 79 which runs around the inner circumference of the tank 11 supported by periodic supporting members 81 that are attached to tank 11 as by welding or other suitable means. Member 83 also runs around the inner circumference of the tank 11 and provides a roof to protect the sprocket 53 from the particulate or granular material within the tank as will hereafter be described. Positioned about the shaft 45 is a freely rotatable bearing member 85 that may rotate freely in respect to the shaft 45 so that should the shaft 45 or sprocket 53 tend to rise, because of storage material being compressed within the perforations 61 of the rails 57, the member 85 will bear on the member 79 so that the sprocket 53 will not and can not disengage the rail 57.

A sleeve-shaped housing 87 of a worm coveyor 89 is positioned as telescoped over the drive shaft 45 between the tubular shaft 19 and the sprocket 53 (extending to near the wall 55 of the tank 11). A second sleeve-shaped member 92 is projected over the shaft 45 and is positioned between the shaft 45 and the housing 87 of the worm conveyor 89. This member is rigidly attached to the housing 87 and the conveyor 89, as by welding or other suitable means, but is separated from the shaft 45 by means of bearing surfaces 91. Hence the worm conveyor 89 is disposed to rotate freely and independently of the shaft 45. The sleeve-shaped member 92 projects through the opening 51 of the tubular shaft 19 to the inside of the shaft wherein it is rigidly attached to a drive sprocket 93. Drive sprocket 93 is driven by a chair 95 which runs through the tubular shaft 19 and is driven by a sprocket 97 that is attached to a drive shaft 101 which is driven by the conventional motor 75 and gearing system 73. In the apparatus as shown by FIG. 2, the chain 95 straddles the shaft 71 but has no direct connection with it. It should be noted that no torque clutch is provided to the drive shaft 101.

Additional support is provided to the shaft 45 between the sprockets 65 and 93 by means of a sleeve 103 rigidly attached (not shown) to the inside surface of the tubular shaft 19. Sleeve 103 is provided with bearing surfaces 105 to allow shaft 45 to freely rotate.

In operation, the storage tank 11 is filled in a conventional manner as by an opening in the top (not shown). Although material will enter the opening 43, it will compact and will not leave the storage tank through such an opening in any quantity. If it is desired, an external enclosure for opening 43 may obviously be easily provided. When it is desired to withdraw the contents of the tank 11, one need merely activate the motor 75. On such an occurrence both of the sprockets 69 and 97 are driven, and consequently shafts 45 and worm conveyor 89 are caused to rotate through sprockets 65 and 93. Rotation of worm conveyor 89 in an appropriately counter-clockwise direction brings material to the opening 43 and forces it through. Simultaneously the rotation of the shaft 45 causes the sprocket 53 to rotate on the rail 57 and this causes the worm conveyor 89, the tubular shaft 19 and the motor housing to rotate so that the conveyor 89 sweeps the entire bottom of the tank 11. Particulate or granular material cannot compact so as to stay clear of the worm conveyor 89 since it is sweeping substantially the entire bottom of the tank. The torque clutch 77 serves to prevent excessive strain on the drive shaft 45 as where the material within the tank is particularly susceptible to compacting; however, such a clutch may be set to keep a constant drive torque on the shaft 71, and hence the shaft 45, so that as soon as the worm conveyor 89 has cleared one area it will be gradually rotated to another. By this means the tank can be substantially emptied from the bottom although the particulate or granular material has a tendency to compact.

FIG. 6 shows another embodiment of the storage facility of the present invention. In this embodiment a tubular shaft 19 is not provided but the motor and gearing apparatus 275 are housed within a housing 213 that is rotatably mounted to a stationary pedestal 217 and disposed to rotate about the pedestal 217 by means of thrust bearings 227 and 229 to which the housing 217 is attached. A protective stationary shield 219 is attached to a conically shaped member 221 that is rigidly attached to the pedestal 217 as at 215. Pedestal 217 is anchored to the cross members 223 and 225 as shown at 230. Only a portion of the pedestal 217 extends between the housing 213 and the member 230 as shown at 231. The drive mechanism 233 and worm conveyor 235 are constructed in a substantially identical manner to that of the embodiment set forth in FIG. 2. Thus, the space-consuming tubular shaft 19 is eliminated; however, the entire mechanism is buried in the material being stored and is inaccessible for maintenance and repair.

Another obvious modification of the aforementioned embodiments is to provide a tubular shaft 19 of sufficient diameter to permit a ladder to be constructed within it. In this manner maintenance and repair personnel can reach and repair drive and gearing apparatus at the foot of the shaft.

It will also be appreciated that the driving mechanism such as the mechanism 17 of the embodiment of FIG. 1 may be located beneath the tank 11. In this eventuality a connecting shaft such as shaft 19 may project through the opening 25 and the drive mechanism appropriately connected to drive shaft 45 and worm conveyor 89 by appropriate and obvious means. Allowance would be made to preserve the openings 43.

As mentioned above, the opening 43 of FIG. 2 may be provided with a closure if deemed necessary. Also, such openings may be provided with grids through which the material may be forced, and hence, reduced in size. Also, obviously, opening 43 may be in the form of several openings in the bottom 41 of the tank 11 in the vicinity of the central axis of the tank.

It is to be understood that the apparatus of the present invention may be constructed of any suitable material, but will generally be constructed of steel and the various components such as beams 21 and support members 29 will be attached to one another as by welding.

The apparatus of the present invention may be employed to remove any particulate material from a silo-type tank including materials such as petroleum sludge and similar semi-liquid materials, particularly those that are susceptible to compacting. For purposes of the present claims, the terms "particulate" and "granular" shall include soft or hard materials including such substances as sludges and silage.

I claim:
1. A storage apparatus comprising:
(a) A cylindrically shaped container having a substantially enclosed bottom at one thereof and being formed with at least one opening in said bottom in substantial alignment with the longitudinal axis of said container;
(b) A shaft member projecting into said container from its bottom in substantial alignment with said axis and being disposed to rotate;
(c) Means for supporting said rotatable shaft member;
(d) A perforated rail extending around the inside circumference of said cylindrical shaped container, said perforations being disposed to receive a drive sprocket;
(e) A radially extending drive shaft rotatably mounted at its inner end to said shaft member and having a drive sprocket rigidly fixed to its outer end and said sprocket being disposed to cooperate with said perforated rail so as to cause said shaft member to rotate and said radially extending drive shaft to pivotally rotate about the said axis on said shaft member when said drive shaft is caused to rotate;
(f) A worm conveyor disposed about said radially extending drive shaft and disposed to rotate independently of said drive shaft so as to transport particulate or granular materials radially inwardly toward said at least one opening so as to eject said material from said container through said at least one opening;
(g) Means for rotating said drive shaft, and
(h) Means for independently rotating said worm conveyor so as to transport particulate or granular materials inwardly toward said at least one opening.

2. A storage apparatus comprising:
(a) A cylindrically shaped container having a substantially enclosed bottom at one end thereof and being formed with at least one opening in said bottom in substantial alignment with the longitudinal axis of said container;
(b) A shaft member projecting into said container from its bottom in substantial alignment with said axis;
(c) Means for supporting said shaft member;
(d) A perforated rail extending around the inside circumference of said cylindrical shaped container, said perforations being disposed to receive a drive sprocket;
(e) A radially extending drive shaft rotatably mounted at its inner end to said shaft member and being disposed to pivotally rotate about said shaft member and having a drive sprocket rigidly attached to its outer end and said sprocket being disposed to cooperate with said perforated rail so as to cause said radially extending drive shaft to pivotally rotate about said shaft member when said drive shaft is caused to rotate;
(f) A worm conveyor disposed about said radially extending drive shaft and disposed to rotate independently of said drive shaft so as to transport particulate or granular materials radially inwardly toward said at least one opening so as to eject said material from said container through said at least one opening;
(g) Means for rotating said drive shaft, and
(h) Means for independently rotating said worm conveyor so as to transport particulate or granular materials inwardly toward said at least one opening.

3. A storage apparatus comprising:
(a) A cylindrically shaped container having a substantially enclosed bottom at one end thereof and being formed with at least one opening in said bottom in substantial alignment with the longitudinal axis of said container;
(b) A shaft member projecting into said container from its bottom in substantial alignment with said axis;
(c) Means for rotatably supporting said shaft member;
(d) A perforated rail extending around the inside circumference of said cylindrical shaped container, said perforations being disposed to receive a drive sprocket;
(e) A radially extending drive shaft rotatably mounted at its inner end to said shaft member and having a drive sprocket rigidly fixed to its outer end and said sprocket being disposed to cooperate with said perforated rail so as to cause said shaft member to rotate and said radially extending drive shaft to pivotally rotate about the said axis on said shaft member when said drive shaft is caused to rotate;
(f) a worm conveyor disposed about said radially extending drive shaft and disposed to rotate indetpendently of said drive shaft so as to transport particulate or granular materials radially inwardly toward said at least one opening so as to eject said material from said container through said at least one opening;
(g) Driving means for driving said drive shaft;
(h) A torque clutch interposed between said driving means and said drive shaft so that only a predetermined torque may be applied to said drive shaft, and
(i) Means for independently rotating said worm conveyor so as to transport particulate or granular materials inwardly toward said at least one opening.

4. A storage apparatus comprising:
(a) A cylindrically shaped container having a substantially enclosed bottom at one end thereof and being formed with at least one opening in said bottom in substantial alignment with the longitudinal axis of said container;
(b) A shaft member projecting into said container from its bottom in substantial alignment with said axis and being disposed to rotate;
(c) Means for supporting said rotatable shaft member;
(d) A perforated rail extending around the inside circumference of said cylindrical shaped container, said perforations being disposed to receive a drive sprocket;
(e) A radially extending drive shaft rotatably mounted at its inner end to said shaft member and having a drive sprocket rigidly fixed to its outer end and said sprocket being disposed to cooperate with said perforated rail so as to cause said shaft member to rotate and said radially extending drive shaft to pivotally rotate about the said axis on said shaft member when said drive shaft is caused to rotate;
(f) A worm conveyor disposed about said radially extending drive shaft and disposed to rotate independently of said drive shaft so as to transport particulate or granular materials radially inwardly toward said at least one opening so as to eject said material from said container through said at least one opening;
(g) Driving means for driving said drive shaft;
(h) A torque clutch interposed between said driving means and said drive shaft so that only a predetermined torque may be applied to said drive shaft, and (i) Means for independently rotating said worm conveyor so as to transport particulate or granular materials inwardly toward said at least one opening.

5. A storage apparatus comprising:
(a) A cylindrically shaped container having a substantially enclosed bottom at one end thereof and being formed with at least one opening in said bottom in substantial alignment with the longitudinal axis of said container;
(b) A shaft member projecting into said container from its bottom in substantial alignment with said axis;
(c) Means for supporting said shaft member;
(d) A radially extending drive shaft mounted at its inner end to said shaft member and being disposed to pivotally rotate about said shaft member;
(e) Driving means for driving the extended end of said radially extending drive shaft about said shaft member;
(f) A worm conveyor disposed about said radially extending drive shaft and disposed to rotate on said drive shaft and
(g) Independent means for rotating said worm conveyor on said drive shaft so as to transport particulate or granular materials radially inwardly toward said at least one opening so as to eject said material from said container through said at least one opening;

6. A storage apparatus comprising:
(a) A cylindrically shaped container having a substantially enclosed bottom at one end thereof and being formed with at least one opening in said bottom in substantial alignment with the longitudinal axis of said container;
(b) A shaft member projecting into said container from its bottom in substantial alignment with said axis and being disposed to rotate;
(c) Means for supporting said rotatable shaft member;
(d) A radially extending drive shaft rotatably mounted at its inner end to said shaft member and being disposed to pivotally rotate with said shaft member;
(e) Driving means for driving the extended end of said radially extending drive shaft so as to effect rotation of said drive shaft and shaft member;
(f) A worm conveyor disposed about said radially extending drive shaft and disposed to rotate on said drive shaft and
(g) Independent means for rotating said worm conveyor on said drive shaft so as to transport particulate or granular materials radially inwardly toward said at least one opening so as to eject said material from said container through said at least one opening.

References Cited in the file of this patent

UNITED STATES PATENTS

| | | |
|---|---|---|
| 1,275,558 | Holmgreen | Aug. 13, 1918 |
| 2,279,640 | Ringmarck | Apr. 14, 1942 |
| 2,592,559 | Graham et al. | Apr. 15, 1952 |

OTHER REFERENCES

German application 1,088,874, printed Sept. 8, 1960.